United States Patent
Neuman

(12) 
(10) Patent No.: US 6,345,796 B1
(45) Date of Patent: Feb. 12, 2002

(54) TABLE HOOK FOR PURSES AND THE LIKE

(75) Inventor: David T. Neuman, New York, NY (US)

(73) Assignee: P.K. Torten Enterprises, New York, NY (US)

(*) Notice: Subject to any disclaimer, the term of this patent is extended or adjusted under 35 U.S.C. 154(b) by 0 days.

(21) Appl. No.: 09/740,647

(22) Filed: Dec. 19, 2000

(51) Int. Cl.[7] ............................. A47F 5/08; F16B 45/00
(52) U.S. Cl. .................. 248/308; 248/215; 248/231.81; 248/914; 248/227.2
(58) Field of Search .................. 248/308, 304, 248/307, 301, 914, 227.1, 227.2, 229.26, 229.16, 225.21, 231.21, 231.81, 231.85, 215, 95

(56) References Cited

U.S. PATENT DOCUMENTS

| | | | | |
|---|---|---|---|---|
| 1,220,717 A | * | 3/1917 | Bennett | 248/227.2 |
| 1,420,724 A | * | 6/1922 | Marona et al. | 248/227.2 |
| 1,856,847 A | * | 5/1932 | Gates | 248/231.81 |
| 2,461,071 A | * | 2/1949 | Mettenleiter | 248/227.2 |
| 2,473,086 A | | 6/1949 | Montero | 248/308 |
| 2,504,086 A | * | 4/1950 | Peters, Jr. | 248/71 |
| 2,516,760 A | | 7/1950 | Doran | 248/229 |
| 2,521,037 A | | 9/1950 | Brinton | 248/215 |
| 2,532,255 A | | 11/1950 | Davis | 248/215 |
| 2,565,719 A | * | 8/1951 | Church | 248/215 |
| 2,631,803 A | | 3/1953 | Meyers | 248/215 |
| 3,240,463 A | | 3/1966 | Cook | 248/339 |
| 3,321,166 A | | 5/1967 | Gordon | 248/206 |
| 3,376,006 A | | 4/1968 | Zezula | 248/227 |
| 3,599,916 A | * | 8/1971 | Szabo | 248/73 |
| 3,767,152 A | | 10/1973 | Killinger | 248/226 |
| 3,773,288 A | | 11/1973 | Bolton | 248/226 |
| 3,860,210 A | | 1/1975 | Berardinelli et al. | 248/308 |
| 4,194,714 A | * | 3/1980 | Schultz | 248/308 |
| 4,210,302 A | | 7/1980 | Serkez | 248/308 |
| 4,312,455 A | * | 1/1982 | Weber | 211/119.005 |
| 4,477,046 A | * | 10/1984 | Repp | 248/95 |
| 4,728,069 A | * | 3/1988 | Semcer | 248/227.2 |
| 4,978,093 A | | 12/1990 | Kennedy | 248/205 |
| D314,864 S | | 2/1991 | Creed | D3/54 |
| 5,000,418 A | | 3/1991 | Vogt | 248/689 |
| 5,082,225 A | * | 1/1992 | Nespoli | 248/231.81 |
| 5,094,417 A | | 3/1992 | Creed | 248/215 |
| 5,458,301 A | | 10/1995 | Cournoyer | 248/95 |
| 5,594,419 A | | 1/1997 | Lo | 340/568 |
| D384,505 S | | 10/1997 | Stewart | D3/328 |

* cited by examiner

*Primary Examiner*—Anita King
(74) *Attorney, Agent, or Firm*—Darby & Darby

(57) ABSTRACT

An assembly for suspending a purse or bag from a table edge is disclosed. The assembly includes a mechanism for automatically anchoring itself to the table edge as it is positioned about the table edge. In addition, the inventive assembly is constructed so as to distribute the weight of the purse or bag to primary support elements. A hook depends downwardly from a bracket to support a bag or purse. The hook includes a flange seated within an opening of the bracket. The flange transfers at least some of the weight of the bag or purse to the bracket. A rivet co-joins the bracket, hook and anchoring mechanism together, and permits rotational movement of the hook relative to the bracket.

20 Claims, 2 Drawing Sheets

TABLE HOOK FOR PURSES AND THE LIKE

FIELD OF THE INVENTION

The present invention relates to improvements in devices for receiving, hanging and supporting purses, handbags, other bags and the like from the edge of a table.

BACKGROUND OF THE INVENTION

Several devices are known in the literature for supporting handbags, purses and the like frmo the edge of a table. Such devices provide benefits in restaurants, for example, by enabling the owner to position such belongings close at hand, yet not on the table surface or on the floor. Many benefits result, including maintaining space on the table, preventing soiling of or damage to the handbag, etc., and minimizing the risk that the bag will be misplaced, forgotten, or stolen.

A number of such devices are described in the patent literature. The closest reference known to Applicant is U.S. Pat. No. 5,094,417 of inventor Creed. The '417 patent describes a handbag support for the edge of a table which includes a C-shaped bracket 25 and a downwardly depending hook 41 which rotates about a rivet 42. The device of the '417 patent lacks any element to anchor the bracket to a table edge. Instead, the device freely hangs from the table edge. Also, the device of the '417 uses the rivet 42 to support all of the weight of the bag and its contents.

What remains needed in the art is an improved adaptable support for hand bags and the like which overcomes the limitations of prior art designs. The present invention provides such an improvement.

SUMMARY OF THE INVENTION

The present invention is an assembly for suspending a purse or bag from a table edge. The assembly of the present invention includes a mechanism for automatically anchoring itself to the table edge as it is moved into a mounting position. In addition, the inventive assembly is constructed so as to distribute the weight of the purse or bag to primary support elements.

In a preferred configuration, the assembly comprises a generally C-shaped bracket having an opening with a leaf spring disposed within the opening of the bracket and arranged to flex into that opening in response to an external force applied by the table edge. The leaf spring constitutes the preferred anchoring mechanism for anchoring the assembly to the table edge.

The assembly further comprises a hook which depends downwardly from the bracket which has a portion such as a flange seated within the opening of the bracket. The flange functions to transfer at least some of the weight of the bag or purse to the bracket.

The assembly further includes a rivet which co-joins the bracket, leaf spring and hook. The rivet permits rotational movement of the hook relative to the bracket. Because purses and bags can have arbitrary dimensions and arrangements of straps relative to their respective bag portions, the rotatable hook arrangement better accommodates a full range of bags.

These and other features and advantages can be appreciated from the accompanying Drawing Figures and Description of a Preferred Embodiment.

BRIEF DESCRIPTION OF THE DRAWINGS

The drawings form of part of the instant specification and are to be read in conjunction therewith. In the various views, like numerals are used to indicate like parts.

DETAILED DESCRIPTION OF A PREFERRED EMBODIMENT

By way of overview and introduction, the present invention provides a support from which purses, handbags, and objects of other design can be readily suspended from the edge of a table. The assembly of the present invention is configured for simple and secure attachment to a table edge, and ready removal therefrom. A variety of table thicknesses can be accommodated, for example, table edge thicknesses from about ¾" to about 1 ½" which range constitutes the typical edge thickness of most tables used in restaurants. The assembly of the present invention is also specially configured to support a substantial load that may be imposed by a filled purse or bag (e.g., 10 lbs), as will be better appreciated from the discussion of FIGS. 1 and 2 below.

Figure 1:
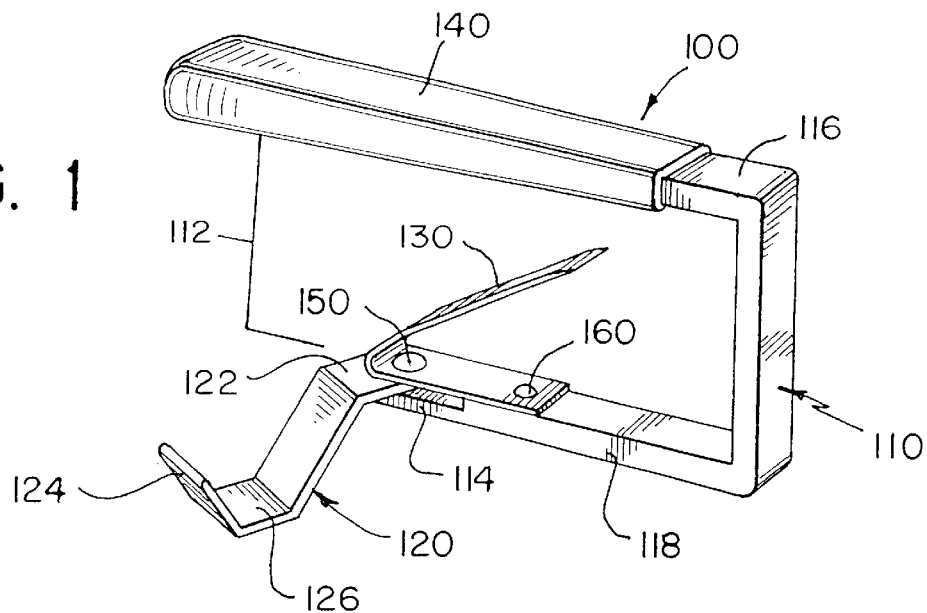
FIG. 1 is a side perspective view of a preferred embodiment of the invention, showing such removably engaged with a tabletop edge or desk edge with a handbag or purse engaged with the lower hook of the subject device.
Figure 2:
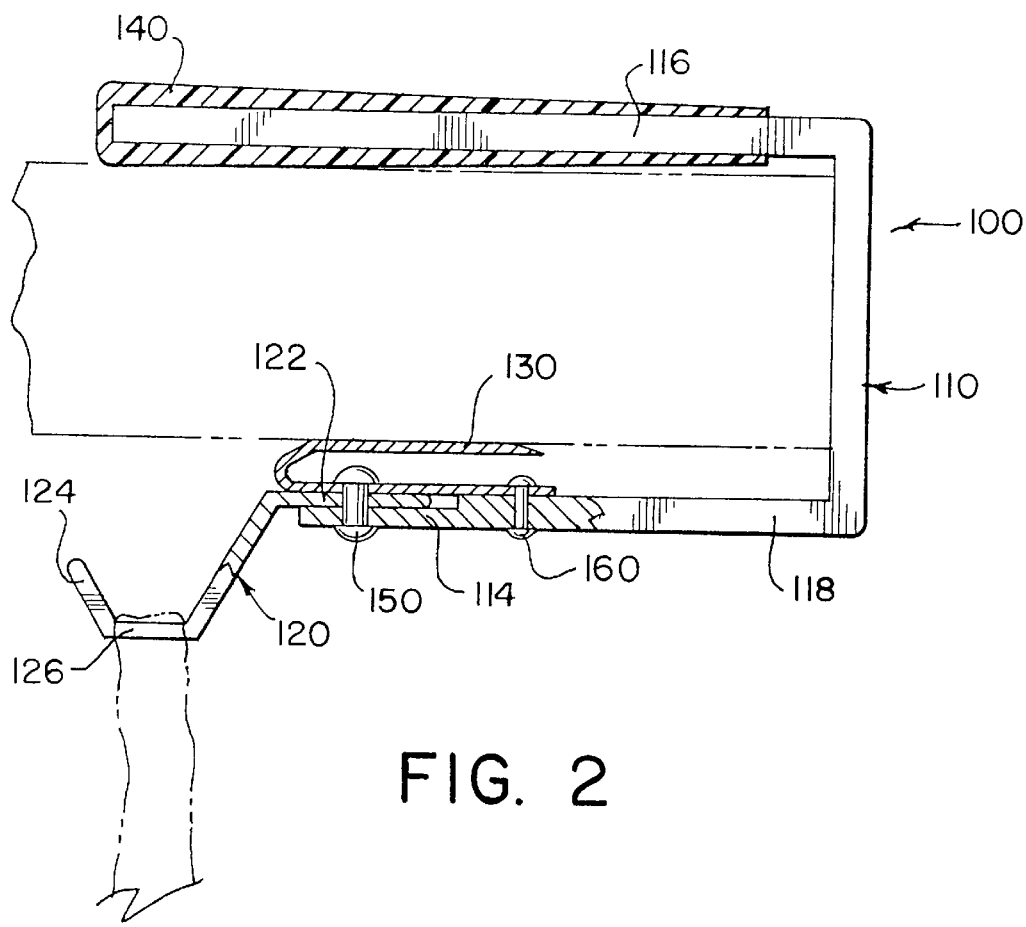
FIG. 2 is a cross-sectional view of the device of FIG. 1, now showing the device engaged with a table edge phantom lines) and the hook in a rotated position relative to FIG. 1.

With reference now to FIGS. 1 and 2, the assembly 100 of the preferred embodiment includes six components: a bracket 110, a hook 120, a leaf-spring 130, a primary rivet 150 and a secondary rivet 160. The preferred embodiment is also illustrated with an optional cover 140, described below; though the shape and indicia imparted to the cover can be features of the top surface of the bracket itself. The bracket 110 is generally C-shaped and has an opening 112 which is normally closed by the pre-shaped leaf-spring 130. The opening 112 is preferably sized so as to accommodate a variety of table edge thicknesses, and is most preferably about 2" high, 4" deep as measured from a top leg 116, and 3" deep as measured from a bottom leg 118.

The leaf-spring 130 is arranged to flex into the opening 112 when the assembly 100 is positioned over the edge of a table. Specifically, the leaf-spring 130 has one end secured to the bracket 110 by rivets 150, 160 and a second, free end which cams into a tensioned position in response to the opening 112 being advanced over a table edge (as shown in FIG. 2, the table edge being illustrated in phantom lines). Upon removal of the bracket 110 from the table edge, the leaf-spring automatically returns to its pre-shaped and non-tensioned position (as shown in FIG. 1) due to its natural bias. The rivets keep the leaf-spring and bracket oriented as shown.

The hook 120 depends downwardly from the bracket 110 and is mounted for rotational movement relative to the bracket about the primary rivet 150. In particular, the hook includes a flange 122 which is seated within the opening of the bracket 110 upon a ledge or shelf 114 thereof. The shelf 114 absorbs a portion of the weight of a bag or purse suspended from the hook by transfer of the gravitational force from the flange to the bracket and then to the table edge. The primary rivet 150 passes downwardly through the leaf-spring 130, the flange 122 of the hook 120, and then the bracket 110 to co-join these elements about the axis of the rivet. The hook further includes an upwardly extending lip 124 which prevents the strap of a purse or other bag from being dislodged inadvertently from a strap seat 126.

The cover 140 is preferably made of a non-skid material such as rubber and certain polymers and plastics. The cover 140 can be comparatively more non-skid than the material selected for the bracket 110 (which can be steel or plastic, for example).

Figure 3:
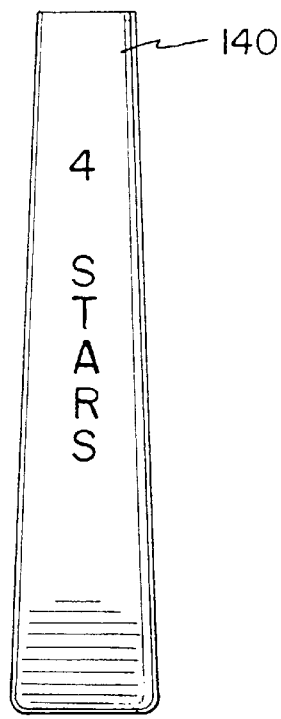
FIG. 3 is a top view of a cover element of the preferred embodiment showing arbitrary indicia thereupon.
Figure 4:
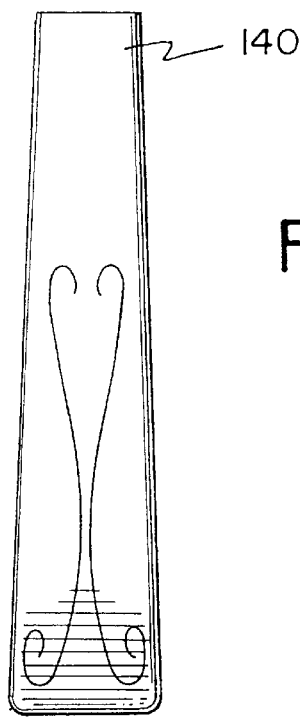
FIG. 4 is the top view of FIG. 3, now showing the cover with different indicia.

With reference now to FIGS. 3 and 4, two variations of the cover 140 are illustrated. In FIG. 3, the cover includes text indicia which has been printed on or embossed on or molded into the cover. The indicia can identify a particular restaurant, company, or event (e.g., wedding, anniversary). FIG. 4 illustrates decorative indicia such as is included on conventional utensils. It should be understood that in addition to its non-skid properties, the cover 140 can provide promotional and aesthetic benefits to the assembly 100. The cover 140 can be removable from the bracket 110 or affixed permanently by a shrink fit, adhesive, or melting process.

Figure 5:
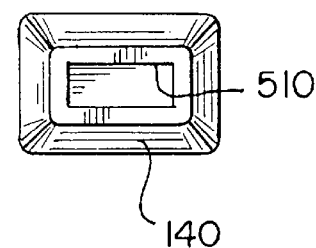
FIG. 5 is an end view of the cover of FIG. 3.

FIG. 5 is an end view of the cover 140, showing an opening 510 which is preferably sized to snugly receive the top leg 116 of the bracket 110.

Regardless of whether a cover 140 is provided, a protective coating can be applied to at least a portion of the bracket 110 (such as the top leg 116) and/or to at least a portion of the hook 120 (such as the lip 124). The protective coating can be a rubber, polymer or plastic coating applied in a variety of ways, such as by a dip, spray or brush coating process. Preferably, the coating comprises a plastic tape having an adhesive on one side thereof, such as manufactured by the 3M Corporation. A coating is preferably provided on the top surface of the leaf spring 130 to protect a table or table cloth upon engagement, and also on the undersurface of the top portion of the bracket which is seated upon the table top (see FIG. 1).

Preferably, both the bracket 110 and the hook 120 each have a strength sufficient to support about 15 pounds. The bracket and hook are preferably made of the same material (e.g., plastic or steel), though need not be constructed in that way.

Figure 6:
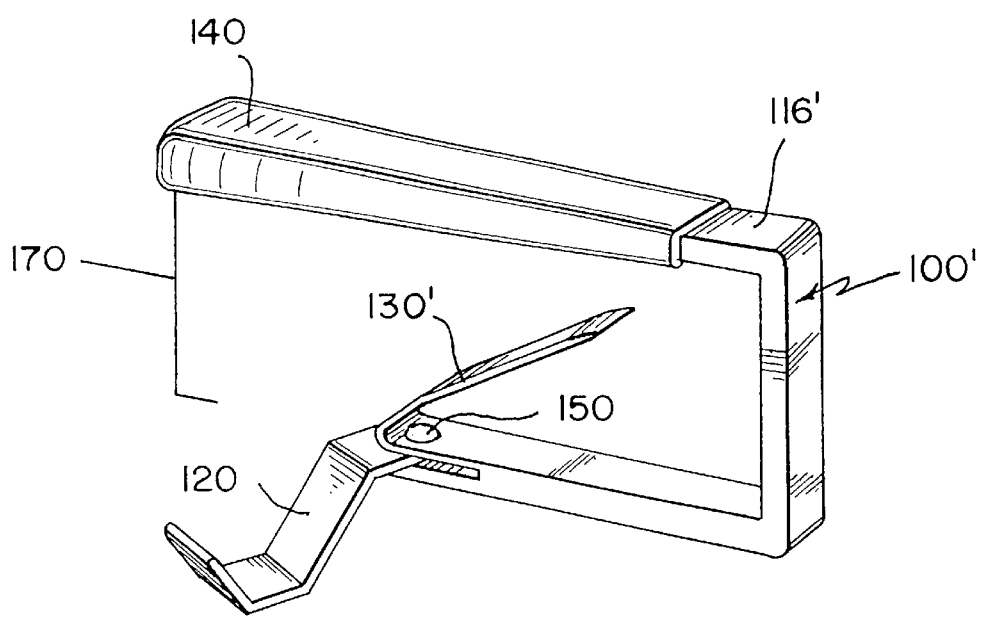
FIG. 6 illustrates a modified version of the preferred embodiment.

As shown in FIG. 6, the bracket 110' can be molded from a plastic together with the leaf-spring 130' to constitute a brace 170 which engages the table edge. In this modified version of the preferred embodiment, the durometer and/or thickness of the brace is controlled to achieve a flexible leaf-spring portion relative to the more rigid bracket portion. The hook 120 is rotatably mounted to the brace 170 by the rivet 150 to complete an assembly 100'. A cover 140 is optionally placed over the top leg 116' of the brace. Alternatively, a protective and/or non-skid coating is optionally applied to some or all of the assembly 100'.

In use, the assembly 100, 100' is slid over the edge of a table by positioning the opening 112 toward the table edge and advancing the assembly about the edge. The assembly is properly seated when it cannot be advanced any farther, that is, when the table edge generally abuts the bite of the C-shaped bracket. As the bracket 110, 110' is advanced over and about the table edge, the leaf-spring 130, 130' flexes from its normally biased closed position to an open position which permits the table edge to be received within the opening 112. The natural restoring force of the pre-shaped leaf-spring urges upwardly in an attempt to close the opening 112 while at least partially clamping the assembly in place about the table edge.

The hook 120 can be freely rotated between the positions shown in FIGS. 1 and 2 to accommodate purses and bags of various dimensions. Optionally, washers can be provided about the rivet 150 between the hook and one or more of the other basic elements of the assembly 100 to ease rotation of the hook or to permit the hook to positively stop at one or more prescribed rotational orientations (e.g., by way of complementary protuberances and depressions).

While the present invention has been described with respect to a particularly preferred embodiment, the invention is susceptible to implementation in other ways which are within the spirit of the invention which is defined in terms of the recitations of the appended claims and equivalents thereof

I claim:

1. An assembly for suspending a purse from a table edge, comprising:
    a) a generally C-shaped bracket having an opening;
    b) a leaf spring disposed within said-generally C-shaped bracket and arranged to flex into the opening of said C-shaped bracket in response to an external force applied by the table edge;
    c) a hook depending downwardly from said bracket and mounted for rotational movement relative to said bracket, the hook including a flange seated within the opening of the C-shaped bracket; and
    d) a rivet co-joining said bracket, leaf spring and hook.

2. The assembly as in claim 1, further comprising a protective coating on at least a portion of the C-shaped bracket.

3. The assembly as in claim 2, further comprising a protective coating on at least a portion of the hook.

4. The assembly as in claim 1, further comprising a protective coating on at least a portion of the hook.

5. The assembly as in claim 1, further comprising a cover on at least a portion of the C-shaped bracket.

6. The assembly as in claim 5, wherein the cover is removable.

7. The assembly as in claim 5, wherein the cover includes text or decorative indicia.

8. The assembly as in claim 1, wherein the bracket is substantially rigid as compared to the leaf spring.

9. The assembly as in claim 8, wherein the bracket is constructed of a first preselected material having a strength sufficient to support up to about fifteen pounds.

10. The assembly as in claim 9, wherein the hook is constructed of a second preselected material having a strength sufficient to support up to about fifteen pounds.

11. The assembly as in claim 10, wherein the first and second preselected materials are the same.

12. An assembly for suspending a purse from a table edge, comprising:
    a) a brace including a generally C-shaped bracket portion having an opening and a leaf spring portion integral with said bracket and arranged to flex into the opening thereof in response to an external force applied by the table edge;
    b) a hook depending downwardly from said brace and mounted for rotational movement relative thereto, the hook including a flange seated within the opening of the bracket portion; and
    c) a rivet co-joining said brace and said hook.

13. The assembly as in claim 12, further comprising a protective coating at least partially covering the bracket portion of the brace.

14. The assembly as in claim 13, further comprising a protective coating on at least a portion of the hook.

15. The assembly as in claim 12, further comprising a protective coating on at least a portion of the hook.

16. The assembly as in claim 12, further comprising a cover on at least a portion of the brace.

17. The assembly as in claim 16, wherein the cover is removable.

18. The assembly as in claim 12, wherein the bracket is substantially rigid as compared to the leaf spring.

19. The assembly as in claim 18, wherein the bracket is constructed of a first preselected material having a strength sufficient to support up to about fifteen pounds, and wherein the hook is constructed of a second preselected material having a strength sufficient to support up to about fifteen pounds.

20. The assembly as in claim 19, wherein the first and second preselected materials are the same.

\* \* \* \* \*